June 13, 1961 W. K. T. GLEIM ET AL 2,988,500
TREATMENT OF HYDROCARBON DISTILLATES
Filed March 13, 1959
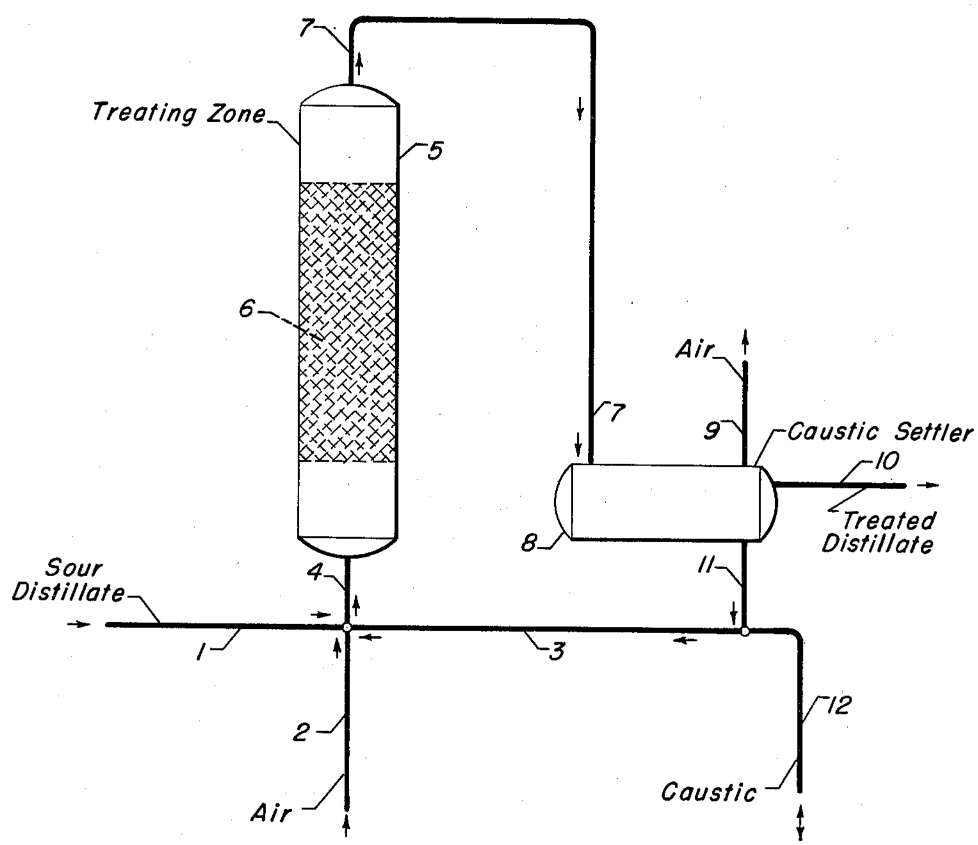
INVENTORS:
William K. T. Gleim
Peter Urban
BY: Chester J. Giuliani
Bernard L. Kramer
ATTORNEYS United States Patent Office 2,988,500

Patented June 13, 1961

2,988,500

TREATMENT OF HYDROCARBON DISTILLATES

William K. T. Gleim, Island Lake, and Peter Urban, Northbrook, Ill., assignors to Universal Oil Products Company, Des Plaines, Ill., a corporation of Delaware Filed Mar. 13, 1959, Ser. No. 799,204
9 Claims. (Cl. 208—206)

This is a continuation-in-part of our copending application Serial No. 714,937, filed February 13, 1958, now U.S. Patent No. 2,882,224, and relates to the treatment of hydrocarbon distillates. More particularly, the present invention relates to a novel method of converting mercaptans contained in said distillates by oxidizing the same to disulfides in the presence of a novel catalyst composition.

The novel process of the present invention is particularly applicable to the treatment of petroleum distillates and particularly sour gasoline, including cracked gasoline, straight run gasoline, natural gasoline, or mixtures thereof, naphtha, jet fuel, kerosene, aromatic solvent, stove oil, range oil, fuel oil, etc. Other hydrocarbon distillates include lubricating oil, as well as normally gaseous fractions. In still another embodiment the novel features of the present invention may be utilized for purifying other organic fractions containing certain acidic components. These organic compounds include alcohols, ketones, aldehydes, etc.

In one embodiment the present invention relates to a process for treating a sour hydrocarbon distillate which comprises reacting mercaptans contained in said distillate with an oxidizing agent by passing said distillate, said oxidizing agent and an alkaline reagent into contact with a fixed bed of a phthalocyanine catalyst composited with a carrier.

In a specific embodiment the present invention relates to a process for sweetening sour gasoline which comprises oxidizing mercaptans contained in said gasoline by passing said gasoline, air and caustic solution into contact with a fixed bed of cobalt phthalocyanine sulfonate composited with a charcoal carrier.

In our parent application we have disclosed the use of a phthalocyanine catalyst for treating a sour hydrocarbon distillate. In the specific process disclosed, the phthalocyanine catalyst is dissolved or suspended in an alkaline reagent solution and contacted with the sour hydrocarbon distillate and oxidizing agent in a liquid phase operation. As therein set forth, the phthalocyanine catalyst is soluble in the alkaline reagent solution and is carried thereby into the treating zone. Because the catalyst is soluble in the alkaline reagent solution and not in the hydrocarbon distillate, the catalyst is removed from the treating zone in commingled state with the alkaline reagent solution and is not dissolved in or carried away in the treated hydrocarbon distillate.

In accordance with the present invention the phthalocyanine catalyst is composited with a suitable carrier and utilized as a fixed bed in the treating zone. Although the catalyst is soluble in alkaline treating solutions as hereinbefore set forth, it has been found that the catalyst will be retained on the carrier and thereby permit the use of the fixed bed type of operation herein proposed. In many cases it is desirable to use a packing material in the treating zone and, in accordance with the present invention, the fixed bed of catalyst and carrier serves a dual purpose of providing a catalyst required for the oxidation of mercaptans and also to provide the desired packing material in the treating zone.

The invention is explained further with reference to the accompanying flow diagrammatic drawing which illustrates one specific embodiment of the invention. In the interest of simplicity, the drawing will be described with reference to the treatment of a sour hydrocarbon distillate using caustic solution (sodium hydroxide) and air, although it is understood that other organic compounds, other alkaline solutions, other oxidizing agents and other specific methods of operation may be employed. Also, in the interest of simplicity, valves, pumps, heaters, coolers, heat exchangers, etc. are omitted from the drawing.

Referring to the drawing, sour hydrocarbon distillate is introduced into the process through line 1, air is introduced through line 2, and caustic solution is recycled by way of line 3. The mixture is passed by way of line 4 into treating zone 5 containing a fixed bed of phthalocyanine catalyst composited with a carrier as illustrated at 6. When desired, the sour distillate, air and/or caustic may be introduced separately to treating zone 5. In still another embodiment, instead of upward flow as illustrated in the drawing, downward flow may be employed.

As hereinbefore set forth, the phthalocyanine catalyst is composited with a suitable carrier and utilized as a fixed bed in the treating zone. Any suitable phthalocyanine catalyst may be utilized in the present invention and preferably comprises a metal phthalocyanine. Particularly preferred metal phthalocyanines comprise cobalt phthalocyanine and vanadium phthalocyanine. Still more preferably the metal phthalocyanine catalyst is utilized as a derivative thereof. A particularly preferred derivative is the sulfonated derivative. Thus, a particularly preferred phthalocyanine catalyst comprises cobalt phthalocyanine sulfonate. Such a catalyst is available commercially and comprises cobalt phthalocyanine disulfonate and also contains the monosulfonate. Another preferred catalyst comprises vanadium phthalocyanine sulfonate. These compounds may be obtained from any suitable source or may be prepared in any suitable manner as, for example, by reacting cobalt, vanadium or other metal phthalocyanine with fuming sulfuric acid. While the sulfonic acids are particularly preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction, the acid chloride is formed and may be converted to the desired carboxylated derivative by conventional hydrolysis.

In the case illustrated in the drawing, treating of the hydrocarbon distillate is effected in the presence of an alkaline reagent. Any suitable alkaline reagent may be employed. A preferred reagent comprises an aqueous solution of an alkali metal hydroxide such as sodium hydroxide solution (caustic), potassium hydroxide solution, etc. Other alkaline solutions include aqueous solutions of lithium hydroxide, rubidium hydroxide, cesium hydroxide, etc. although, in general, these hydroxides are more expensive and therefore are not preferred for commercial use. In some cases the alkaline solution will contain a solubilizer or solutizer including, for example, alcohols such as methanol, ethanol, etc., phenols, cresols, etc., tannin, isobutyrate, etc. A particularly preferred alkaline solution is an aqueous solution of from about 1 to about 50% by weight concentration of sodium hydroxide and, when employed, a preferred solutizer is methanol which may be used in a concentration of from about 1 to about 200 volume percent of the caustic or other alkaline solution. While an alkaline solution is preferred, in another embodiment a solution in a non-alkaline solvent may be employed, but generally the treating is effected in the presence of at least a trace of alkalinity.

The phthalocyanine catalyst is composited with a suitable carrier. The carrier should be insoluble in or substantially unaffected by the caustic solution and hydrocarbons under the conditions prevailing in the treating zone. Activated carbon is particularly preferred because of its high adsorptivity and stability under these conditions. Other carbon carriers include coke, charcoal which may be obtained from any suitable source including bone char, wood charcoal, charcoal made from cocoanut or other nut shells, fruit pits, etc. Other carriers include silica as, for example, sand, glass beads, etc., clays and silicates including those synthetically prepared and naturally occurring, preferably acid, heat or otherwise treated, as, for example, attapulgus clay, china clay, diatomaceous earth, feldspar, fuller's earth, halloysite, kaolin, kieselguhr, mica, montmorillonite, pumice, etc., aluminas and particularly alpha aluminas including corundum, emery, etc., ceramics, porcelain, various magnesium compounds, etc. As hereinbefore set forth, the choice of the carrier will be made with reference to its adsorptive or spacing properties and its stability in the alkaline reagent solution and hydrocarbons at the conditions prevailing in the treating zone.

The composite of phthalocyanine and carrier may be prepared in any suitable manner. In one method the carrier may be formed into particles of uniform or irregular size and shape, including spheres, pills, pellets, rings, saddles, flakes, etc. and the carrier is intimately contacted with a solution of the phthalocyanine catalyst. An aqueous or alkaline solution of the phthalocyanine catalyst is prepared and, in a preferred embodiment, the carrier particles are soaked, dipped, suspended, and immersed in the solution. In another method, the solution may be sprayed onto, poured over or otherwise contacted with the carrier. Excess solution may be removed in any suitable manner, and the carrier containing the catalyst allowed to dry at room temperature, dried in an oven or by means of hot gases passed thereover, or in any other suitable manner.

In general it is preferred to composite as much catalyst with the carrier as will form a stable composite, although a lesser amount may be so deposited, if desired. In one preparation, 1% by weight of cobalt phthalocyanine sulfonate catalyst was composited with activated carbon by soaking granules of the carbon in a solution of the phthalocyanine catalyst. In another method, the carrier may be deposited in the treating zone and the phthalocyanine catalyst solution passed therethrough in order to form the catalyst composite in situ. If desired, the solution may be recycled one or more times in order to prepare the desired composite. In still another embodiment the carrier may be deposited in the treating chamber and the chamber filled with a solution of the catalyst, thereby forming the composite in situ.

As illustrated in the drawing, the fixed bed of catalyst composite is suitably supported as a bed inside the treating zone. The method of supporting beds of solid material in treating zones is well known and need not be described in detail herein. Furthermore, any catalyst which may be removed from the treating zone will eventually be recycled thereto and adsorbed on the carrier at least in part. Thus the catalyst will be present in the treating zone in the required amount.

Treating of the sour hydrocarbon distillate in zone 5 generally is effected at ambient temperature, although elevated temperature may be used and generally will not exceed about 300° F. or more. Atmospheric pressure generally is employed, although superatmospheric pressure up to 1000 pounds per square inch or more may be employed, if desired. The time of contact in the treating zone will be selected to give the desired reduction in mercaptan content and may range from 1 to 48 hours or more, depending upon the size of the treating zone, the amount of catalyst and the particular hydrocarbon distillate being treated.

In treating zone 5 mercaptans are oxidized to disulfides. The total effluent from the treating zone is withdrawn through line 7 and passed into settler 8. Excess air is removed from zone 8 through line 9 and may be vented or reused in the process if desired. The treated hydrocarbon distillate is withdrawn from zone 8 through line 10 and is recovered as the desired product of the process. Caustic solution containing any entrained catalyst is withdrawn from zone 8 through line 11, and while a portion thereof may be removed by way of line 12, preferably at least a portion thereof is recycled by way of lines 3 and 4 to zone 5 for further use therein. Fresh caustic solution and/or additional phthalocyanine catalyst may be introduced into the process by way of lines 12, 3 and 4.

While air is preferred for use in zone 5, it is understood that any other suitable oxidizing agent may be employed, including oxygen or other oxygen-containing gases. In some cases the sour hydrocarbon distillate may contain entrained oxygen or air in sufficient concentration to accomplish the desired treating, but generally it is preferred to introduce air into the treating zone. The amount of air must be sufficient to effect oxidation of the mercaptans, although an excess thereof generally is not objectionable.

The phthalocyanine catalyst is active and stable. Accordingly, the fixed bed catalyst composite may be used for treating a large volume of sour hydrocarbon distillate. As hereinbefore set forth, any catalyst carried away in the alkaline solution will be recycled and in some other cases fresh catalyst may be introduced periodically if desired. In any event improved operation of the treating process is effected in the process disclosed herein.

In some cases, and particularly with sour gasoline, it may be desirable to extract a major proportion of the mercaptan sulfur from the distillate prior to further treating in the manner herein set forth. This may be accomplished by countercurrently contacting the sour hydrocarbon distillate with caustic or other alkaline solution, and separating a partly treated distillate from the caustic solution. The partly treated distillate then is further treated in the manner hereinbefore set forth.

The following examples are introduced to illustrate further the novelty and utility of the present invention but not with the intention of unduly limiting the same.

*Example I*

A composite of cobalt phthalocyanine sulfonate on activated carbon was prepared as follows: The carbon is a commercially available product marketed under the trade name of "Nuchar type WA" and is supplied in granules of 30–40 mesh. It is stated that the carbon is formed from residual organic material which is recovered during the manufacture of pulp and then is carbonized and activated by heating. A small scale preparation was made by dissolving 0.15 gram of cobalt phthalocyanine sulfonate in 25 cc. of water to which 1 cc. of ammonium hydroxide (28%) solution was added. 100 cc. of water then was added thereto and the mixture was stirred. 15 grams (100 cc.) of the activated carbon granules were poured into the solution, stirred slightly and allowed to stand overnight. The following day, the mixture was filtered to separate excess water. 41.9 grams of solid material were recovered and were dried under water pump vacuum to leave a dry composite of 15.2 grams. The filtrate was a faint blue color but was analyzed and found to contain no cobalt. Accordingly, the final catalyst composite contained 1% by weight of the phthalocyanine catalyst.

*Example II*

The catalyst composite prepared as described in Example I was installed as a fixed bed in a treating zone and used for the treatment of various hydrocarbon distillates. One distillate treated was a J. P.–4 jet fuel having an API gravity of 56.1°, a boiling range of 148° to 484° F. and a mercaptan sulfur content of 0.0132% by weight. The treating was effected in substantially the same manner as illustrated in the drawing. The treating zone contained 100 cc. of the catalyst composite prepared as described in Example I. The caustic solution used was a 10° Baumé aqueous solution. The flow rates used were: jet fuel at 50 cc. per hour, caustic at 30 cc. per hour and air at 96 cc. per hour. These were commingled and passed through the treating zone in upward flow. The treating zone was maintained at a temperature of 104° F. and a pressure of 100 p.s.i.g. This run continued for 28 hours, during which time the mercaptan sulfur content was reduced to 0.00026% by weight and below. The jet fuel recovered from the settler was sweet to the doctor test.

*Example III*

The hydrocarbon distillate of this example is a commercial kerosene having a mercaptan sulfur content of 0.0058% by weight. The flow rates used in this example are: kerosene at 100 cc. per hour, caustic at 50 cc. per hour and air at 96 cc. per hour. The caustic solution and treating zone temperature and pressure were the same as described in Example II.

This run continued for 41 hours, during which time the mercaptan sulfur content of the kerosene was reduced to 0.00022–0.00034% by weight. In all cases the kerosene was sweet to the doctor test.

*Example IV*

The hydrocarbon distillate of this example is a blend of thermally cracked and straight run gasolines, the blend having an API gravity of 65.5°, a boiling range of 90° to 393° F. and a mercaptan sulfur content of 0.0130% by weight. The gasoline blend was treated in the same manner as described in Examples II and III, using the same caustic solution and the same treating zone temperature and pressure. The flow rates in this case were hydrocarbon at 100 cc. per hour, caustic solution at 30 cc. per hour and air at 96 cc. per hour.

The above runs continued for 40 hours, during which time the mercaptan sulfur content of the gasoline blend was reduced to 0.00028 to 0.00040% by weight. In all cases the gasoline was sweet to the doctor test.

*Example V*

The hydrocarbon distillate of this example is a $C_5$ hydrocarbon fraction recovered as an overhead from a depentanizer. The solid bed of catalyst was prepared by soaking 100 cc. of carbon Raschig rings in a 10° Baumé aqueous solution containing 50 parts per million of cobalt phthalocyanine sulfonate, followed by filtering and drying in the manner hereinbefore described. The catalyst composite was disposed as a fixed bed in the treating zone and the reaction mixture passed therethrough in upward flow. The rates were as follows: $C_5$ hydrocarbon charge at 100 cc. per hour, caustic recycle rate at about 40 cc. per hour and air at 54 cc. per hour. The treating zone was maintained at a temperature of 104° F. and a pressure at 30 p.s.i.g.

The above run was continued for 63 hours, during which the mercaptan sulfur content of the $C_5$ fraction was reduced to 0.0002% to 0.0004% by weight. In all cases the product was sweet to the doctor test.

*Example VI*

This example describes a process for treating a No. 2 commercial fuel oil having a mercaptan sulfur content of about 0.040% by weight. The catalyst used in this example is vanadium phthalocyanine sulfonate composited with sand, filtered and dried and used as a fixed bed in a treating zone. The alkaline reagent solution is potassium hydroxide of 12° Baumé. The fuel oil, air and potassium hydroxide solution are passed downwardly through a treating zone containing a bed of the catalyst composite. The treating is effected at ambient temperature and 25 p.s.i.g. In this operation, the mercaptan sulfur content of the fuel oil is reduced to below 0.025%. In this case, this reduction is more than satisfactory to produce a final blend of the treated fuel oil with other refinery products to meet the specific mercaptan sulfur specifications of below 0.01% by weight.

We claim as our invention:

1. A process for treating a sour hydrocarbon distillate which comprises reacting mercaptans contained in said distillate with an oxidizing agent by passing said distillate and said oxidizing agent into contact with a fixed bed of a phthalocyanine catalyst composite with a carbon carrier.

2. A process for treating a sour hydrocarbon distillate which comprises reacting mercaptans contained in said distillate with an oxidizing agent by passing said distillate, said oxidizing agent and alkaline solution into contact with a fixed bed comprising 1% by weight of metal phthalocyanine catalyst composited with a carbon carrier.

3. A process for treating a sour hydrocarbon distillate which comprises reacting mercaptans contained in said distillate with oxygen by passing said distillate, an oxygen-containing gas and caustic solution into contact with a fixed bed comprising 1% by weight of cobalt phthalocyanine sulfonate catalyst composited with a carbon carrier.

4. A process for treating a sour hydrocarbon distillate which comprises reacting mercaptans contained in said distillate with oxygen by passing said distillate, an oxygen-containing gas and caustic solution into contact with a fixed bed compriring 1% by weight of vanadium phthalocyanine sulfonate catalyst composited with a carbon carrier.

5. A process for treating a sour hydrocarbon distillate which comprises reacting mercaptans contained in said distillate with air by passing said distillate, air and caustic solution into contact with a fixed bed comprising 1% by weight of cobalt phthalocyanine carboxylate catalyst composited with a carbon carrier.

6. A process for treating a sour hydrocarbon distillate which comprises reacting mercaptans contained in said distillate with air by passing said distillate, air and caustic solution into contact with a fixed bed comprising 1% by weight of vanadium phthalocyanine carboxylate catalyst composited with a carbon carrier.

7. A process for treating a sour gasoline which comprises reacting mercaptans contained in said gasoline with air by passing said gasoline, air and caustic solution into contact with a fixed bed comprising 1% by weight of cobalt phthalocyanine sulfonate catalyst composited with a carbon carrier.

8. A process for treating a sour gasoline which comprises reacting mercaptans contained in said gasoline with air by passing said gasoline, air and caustic solution into contact with a fixed bed comprising 1% by weight of vanadium phthalocyanine sulfonate catalyst composited with a carbon carrier.

9. A process for treating a sour hydrocarbon fluid which comprises reacting mercaptans contained in said fluid with an oxidizing agent by passing said fluid and said oxidizing agent into contact with a fixed bed of a phthalocyanine catalyst composited with a carbon carrier.

References Cited in the file of this patent

UNITED STATES PATENTS

| | | |
|---|---|---|
| 2,303,835 | Ghoslon | Dec. 1, 1942 |
| 2,769,757 | Annable et al. | Nov. 6, 1956 |
| 2,882,224 | Gleim et al. | Apr. 14, 1959 |